(No Model.) 2 Sheets—Sheet 1.

H. R. LEONARD & W. CORCORAN.
PNEUMATIC MINING TUBE.

No. 307,861. Patented Nov. 11, 1884.

Witnesses,
Geo. H. Strong.

Inventors,
H. R. Leonard
W. Corcoran
By Dewey & Co.
Attorneys (No Model.) 2 Sheets—Sheet 2.

H. R. LEONARD & W. CORCORAN.
PNEUMATIC MINING TUBE.

No. 307,861. Patented Nov. 11, 1884.

Witnesses,
Geo. H. Strong

Inventors,
H. R. Leonard
Wm Corcoran
By Dewey & Co.
Attorneys

UNITED STATES PATENT OFFICE.

HARVEY R. LEONARD AND WILLIAM CORCORAN, OF SAN FRANCISCO, CAL.

PNEUMATIC MINING-TUBE.

SPECIFICATION forming part of Letters Patent No. 307,861, dated November 11, 1884.

Application filed November 5, 1883. (No model.)

*To all whom it may concern:*

Be it known that we, HARVEY R. LEONARD and WILLIAM CORCORAN, of the city and county of San Francisco, and State of California, have invented an Improvement in Pneumatic Mining-Tubes; and we hereby declare the following to be a full, clear, and exact description thereof.

Our invention relates to an apparatus which is especially useful in working beneath the surface of rivers or bodies of water, and providing a point of departure from which tunnels, drifts, or adits may be run in various directions for raising auriferous or other materials, &c.; and it consists of vertical tubes or caissons which are sunk to the bed rock, or to the desired depth, means for introducing air under pressure, and providing suitable air-locks and a cage with cocks and pipes, so that it may be raised and lowered at will, together with certain details of construction, all of which will be more fully explained by reference to the accompanying drawings, in which—

Figure 1:
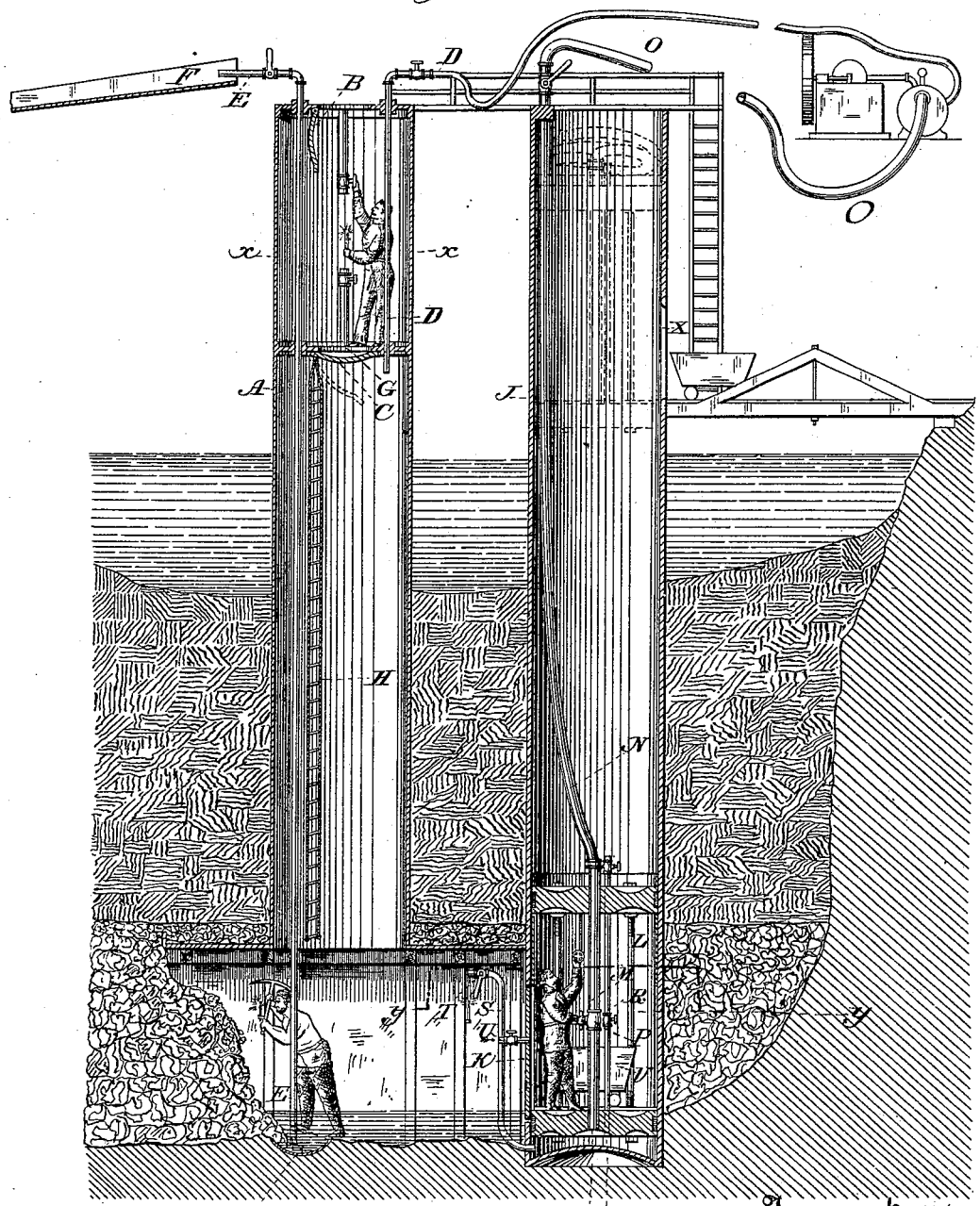
Figure 2:
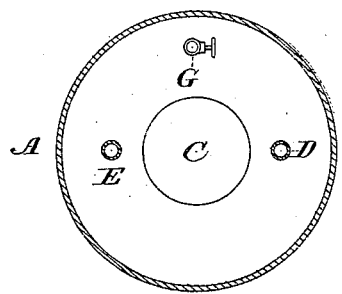
Figure 3:
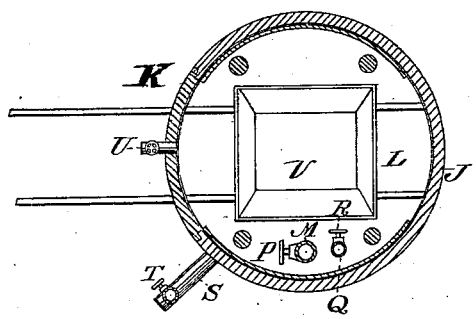
Figure 4:
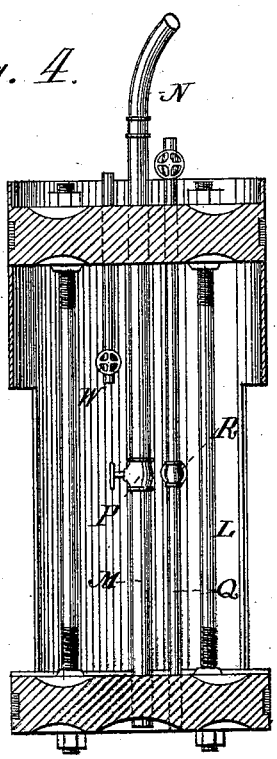

Figure 1 is a vertical section of the working-chamber, showing air-lock, equalizing-pipes, and discharge-pipe. Fig. 2 is a horizontal section, on an enlarged scale, on the line *x x*, Fig. 1. Fig. 3 is a horizontal section on the line *y y*, Fig. 1. Fig. 4 is a vertical section of the cage L.

A is a tube, which is preferably made of boiler-iron of sufficient thickness to resist any pressure to which it may be subjected. This tube extends down to the desired point, and may have an open bottom. At the top is a plate or door, B, fitted so that it may be opened whenever desired, and having its flanges made air-tight, and at a short distance below is a second door, C, the space between forming an air-lock.

D is a pipe connected with the air-compressor, and through which air is forced into the tube below the door C, which is closed until the water in the tube is driven out through the pipe E, which extends to the bottom of the tube, its upper end discharging into a sluice, F. When the water has been forced out by the pressure of the air, the men can enter the chamber between the two doors B and C, and the upper one being closed air is admitted from the tube below into the chamber through the lower equalizing-pipe, G, until the pressure in the chamber being the same, the door C may be opened and the men can descend into the tube by a ladder, H, or other convenient means. A depression or sump, I, at the bottom receives the water, sand, or auriferous material to be raised, and as the pipe E dips into it the pressure of the air drives the material up as long as it is supplied. The contents of this depression are kept stirred, so that the mass will be homogeneous, and will all be elevated together.

As excavations are made away from the bottom of the tube, the tunnel is to be well timbered until a sufficient length is run—say twenty feet—when a second or elevator tube, J, is sunk so that its side is opposite the tunnel. The bottom of this second tube is slightly below the bottom of the tunnel and is closed tight. An opening is made into this tube opposite the tunnel, and a door, K, fits it, closing from the outside. The interior of the tube is made smooth, and a cage, L, is fitted into it, having the heads packed air-tight. A pipe, M, passes through the cage, its lower end opening below it, and the upper end is connected with a flexible tube, N, which extends to the top of the tube J, and connects with a pipe, O, which leads to the compressor. Through this pipe air may be admitted by means of a cock, P, and, passing below the cage, it will raise it to the surface, the flexible tube coiling upon the top of the cage as it goes up.

Q is a pipe passing through the cage, with a cock, R, by which the air below the cage may be allowed to pass out above when it is desired to lower the cage.

S is a pipe leading from the tunnel into the tube J, at the bottom below the cage, and having a cock, T, by which air may be admitted from the tunnel when the cage is to operated from the outside by an assistant.

U is a cock opening from the tunnel into the cage, so that air may be admitted to equalize the pressure, after which the door K may be opened. A car, V, is fitted to run from the tunnel into the cage through the door, and rock or other bulky material may thus be raised or lowered. The operation will then be as follows: The cage will be lowered by opening the cock R in the pipe Q, and allowing air to pass above the cage, which will then sink to the level of the tunnel, the flexible pipe N uncoiling as the cage goes down. When the cage reaches the level of the tunnel, air may be admitted to it through the cock U until the pressure within the cage equals that in the tunnel. The door K may then be opened, and the occupants of the cage, if any, may leave, or others may enter, or if anything has been brought down it can be removed. If rock or other material is to be carried up, it may be loaded upon the car V, and the latter run into the cage, or it may be introduced by other suitable means. The operator within the tunnel can then replace the door K, and the one within the cage may open the cock W, which is attached to a pipe which passes through the top of the cage and allows sufficient air to escape from the cage to insure the sealing of the door K. If the cage is to be raised by the operator within the tunnel, he will then open the cock T and admit air directly from the tunnel to the space below the cage, thus elevating it; but if the occupant of the cage is to operate it, he opens the cock P in the pipe M and allows air from the compressor to pass through this pipe to the chamber below the cage from the flexible tube N, and thus raise it. A door, X, in the tube J corresponding with the position of the car V, when the cage has reached the top, allows the car to be run out. This mechanism gives a convenient mode for entering or leaving the work, and for conveying workmen, timbers, or other material either up or down, and without so great a pressure as would be necessary if it must be forced up through the pipe E. The air-pressure is kept more equal, and the use of the air from the tunnel to raise and lower the cage in the secondary tube enables us to change the air and keep it pure.

Having thus described our invention, what we claim as new, and desire to secure by Letters Patent, is—

1. A means for raising material from excavations or tunnels, consisting of a vertical tube extending down to the bed-rock or point of work, the herein-described means for forcing air into the tube, and a pipe extending upward from the bottom of the excavation, through which water and fine material may be forced by pressure, in combination with a secondary tube provided with a closed bottom extending to the bottom of the excavation or tunnel, and having a door opening from it, a cage adapted to travel in said tube, and the means herein described, by which compressed air may be admitted to raise the cage, substantially as herein set forth.

2. The vertical tubes A J, opening into an underground tunnel or excavation, in combination with the independent pipes and cocks by which compressed air may be admitted to each one of said tubes, the tube A having a pipe extending to the bottom of the excavation, so that water and fine material may be forced up through it, and the other tube having a cage fitted to move in it, and a pipe and cock by which air may be admitted from the tunnel to raise the cage, substantially as herein described.

3. The vertical tube J, having a door opening outwardly from its lower end into the underground excavation or tunnel in which air is compressed, in combination with a cage fitted to move up and down within said tube, and having the upper and lower heads packed air-tight, and a cock, U, by which the pressure within the cage and tunnel may be equalized, so that the door can be opened, substantially as herein described.

4. The vertical tube J, having a door opening from its lower end into an underground excavation or tunnel within which air is compressed, a cage having its ends fitting the tube air-tight, so that it may be raised within the tube by atmospheric pressure, in combination with a cock opening from the tube to the tunnel, by which air may be admitted from the tunnel into the tube below the cage to raise it, substantially as herein described.

5. The vertical tube J, having a door opening from its lower end into an underground tunnel or excavation within which air is compressed, a cage provided with heads fitted air-tight in said tube, a cock by which the pressure within the cage and tunnel may be equalized to allow the door to be opened, and a cock opening upward from the interior of the cage to allow air to escape after the door is closed, to retain the door by pressure from within the tunnel, substantially as herein described.

6. The vertical tube J, having its lower end communicating with an underground tunnel or excavation wherein air is compressed, by means of a door closing inwardly by pressure from the tunnel, in combination with a cage having its ends fitted to move air-tight within the tube, a pipe passing through the cage from top to bottom, with a controlling-cock, and a flexible tube extending upward from this pipe and communicating with the air-compressor, so that air may be admitted below the cage to raise it, substantially as herein described.

7. The vertical tube J, provided with a door at the lower end communicating with an underground tunnel or excavation, in combination with a cage having its ends fitted air-tight within the tube, a pipe passing through the cage from top to bottom and connected by a flexible tube with an air-compressor above, and a second tube passing through the cage and provided with a cock by which the air below the cage is allowed to escape and the cage to descend, substantially as herein described.

8. In an apparatus for working in underground tunnels or excavations under atmospheric pressure, the vertical tubes A and J, having their lower ends communicating with the tunnel, the tube A being provided with an air-supply pipe and cock, an air-lock through which to enter or leave the work, and a pipe through which the water and fine material may be forced to the surface by means of the compressed air within the tunnel, and the tube J having a cage fitted to travel up and down within it, a door opening into the tunnel, and pipe and cock by which the pressure in the tunnel and cage may be equalized and the cage caused to move up or down, substantially as herein described.

In witness whereof we have hereunto set our hands.

HARVEY R. LEONARD.
WILLIAM CORCORAN.

Witnesses:
S. H. NOURSE,
H. C. LEE.